W. T. DONNELLY.
FLEXIBLE PIPE.
APPLICATION FILED APR. 27, 1910.

982,482.

Patented Jan. 24, 1911.

WITNESSES:

INVENTOR
William Thomas Donnelly
BY Blackwood Bros
ATTORNEYS

UNITED STATES PATENT OFFICE.

WILLIAM THOMAS DONNELLY, OF BROOKLYN, NEW YORK.

FLEXIBLE PIPE.

982,482.

Specification of Letters Patent. Patented Jan. 24, 1911.

Application filed April 27, 1910. Serial No. 557,977.

*To all whom it may concern:*

Be it known that I, WILLIAM THOMAS DONNELLY, a citizen of the United States, residing at Brooklyn, in the county of Kings and State of New York, have invented certain new and useful Improvements in Flexible Pipes, of which the following is a specification.

My invention relates to flexible pipes.

It has for its object to provide a flexible pipe having means adapted to hold its flexible body distended under all conditions and protect the outer surface of its flexible body from contact with surfaces and obstacles, thereby preventing the flexible body thereof from becoming crushed or cracked by bodies falling or being brought to bear on it and preventing the outer surface of its flexible body from becoming worn by the pipe contacting with surfaces or obstacles in being drawn over or against them.

It has for a further object to provide means adapted to protect the interior surface of the flexible body from becoming worn by the passage of sand and stone through the pipe.

It has for a further object to hinge the means for protecting the interior of the flexible body of the pipe so that it can be easily and readily initially installed therein and so that, if necessary, the parts thereof can be easily and readily removed at any point, and other parts substituted therefor.

It has for a further object to provide means for governing the movement of the hinged means which protects the interior of the flexible body of the pipe.

It has for a further object to so construct and arrange the means for protecting the interior of the flexible body of the pipe that when water is passing through the pipe it will pass under and around said means and thereby keep the pipe clear of sand and obstacles and preserve its flexibility.

It has for a still further object to provide a flexible pipe of the character set forth embodying advantages in point of lightness in weight and simplicity of construction which is consistent with the work it is designed to perform.

Figure 1:
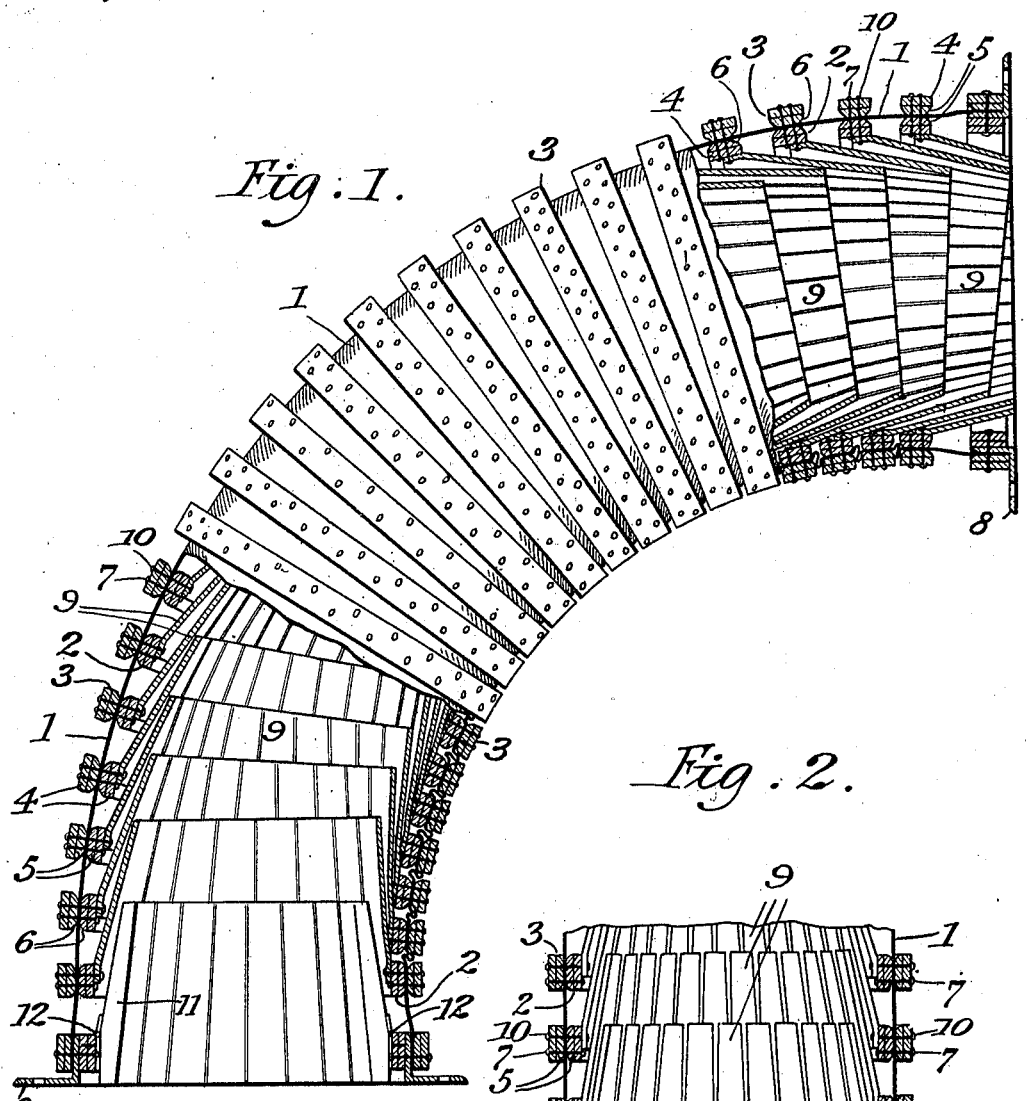
Figure 2:
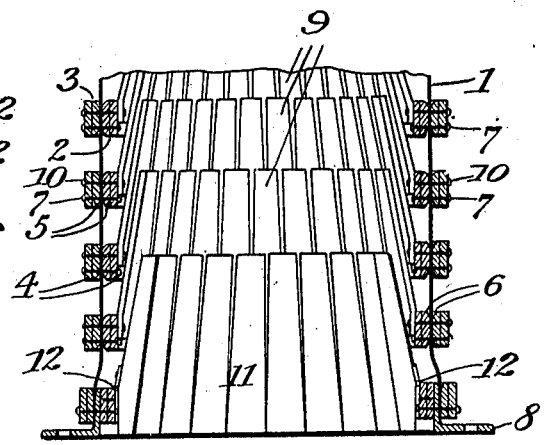

In the drawings: Figure 1 is a side view, partly broken away and in section of my flexible pipe, shown bent. Fig. 2, a fragmentary sectional view of my pipe, shown straight.

Referring to the drawings illustrating my invention and in which like letters of reference designate corresponding parts, my flexible pipe consists of a tubular body 1 of canvas or other suitable flexible material interposed, from end to end, between inner and outer circular bands 2 and 3 respectively of wood or other suitable material, spaced a short distance apart. Each band consists of two circular sections 4 and 5, one located within the other and the inner edges of the inner sections are rounded at 6 so that when the pipe is bent, only rounded surfaces will bear against the canvas and therefore it will not be cut or damaged by the bands and by means of these rounded edges, recesses are formed which receive the canvas, when it is folded between the bands by reason of said bands being moved toward one another in bending the pipe, and thereby allow the bands to come close together. The sections of each band are secured together and the inner and outer oppositely located bands are secured together and to the canvas body of the pipe interposed between them, by rivets 7 of copper or other suitable, non-rustable material which pass through said bands and canvas pipe. Flanged metal collars 8 are secured between the bands at the ends of the flexible pipe by means of the rivets which secure said bands and the canvas body of the pipe together.

A protective lining for the pipe is formed by means of strips 9 of rawhide or other suitable material, preferably flexible material. The strips are hinged in circular series to the inner bands of the pipe by means of rivets 10 of copper or other suitable, non-rustable material which pass through the strips at one end and the bands and canvas and said strips are arranged so that those of adjacent series overlap in staggered relation to one another. By forming the protective lining of the pipe of strips, if necessary, parts may be removed and replaced at any point, and by overlapping the strips at one end and hinging them at the other end they have a spring action when the mixture of water, sand, earth and stone is passing over them and therefore are not worn as much thereby as would be the case if they were rigid, and by the arrangement of the hinged strips so that those of adjacent series overlap in staggered relation to one another, said strips completely cover the interior of the canvas body and the bands on the interior thereof and prevent wear thereof by the passage of the mixture of water, sand, earth and stone through the pipe and yet allow water to pass under and around them and thus keep the pipe clear of all obstacles and preserve its flexibility. The extent of movement of the strips is governed by means of arms 11 forming abutments and being secured to the inner bands 2 of the pipe at one end thereof by hinges 12 so that their inner ends extend over and a short distance above the first series of strips 9 and their outer ends rest on the band 2 to which they are secured.

While this pipe is adaptable for use wherever a flexible connection is required, it is particularly adaptable for use as a flexible connection between sections of pipe lines used in connection with dredging apparatus, on account of its lightness, capability of being easily and readily repaired, adaptability to resist wear of its interior and exterior, capability of being kept clean and flexibility.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

I claim:

1. A flexible pipe having a lining comprising series of strips, the strips of adjacent series overlapping and the overlapping ends being free, substantially as described.

2. A flexible pipe having a lining comprising series of strips, the strips of adjacent series overlapping in staggered relation to one another, substantially as described.

3. A flexible pipe having a lining comprising series of hinged strips, the strips of adjacent series overlapping and the overlapping ends being free, substantially as described.

4. A flexible pipe having a lining comprising series of hinged strips, the strips of adjacent series overlapping in staggered relation to one another, substantially as described.

5. A flexible pipe having a lining comprising series of flexible strips, the strips of adjacent series overlapping and the overlapping ends being free, substantially as described.

6. A flexible pipe having a lining comprising series of flexible strips, the strips of adjacent series overlapping in staggered relation to one another, substantially as described.

7. A flexible pipe having a lining comprising series of hinged flexible strips, the strips of adjacent series overlapping and the overlapping ends being free, substantially as described.

8. A flexible pipe having a lining comprising series of hinged flexible strips, the strips of adjacent series overlapping in staggered relation to one another, substantially as described.

9. A flexible pipe comprising bands connected by flexible means and series of strips on said bands, the strips of adjacent series overlapping and the overlapping ends being free, substantially as described.

10. A flexible pipe comprising bands connected by flexible means and series of strips on said bands, the strips of adjacent series overlapping in staggered relation to one another, substantially as described.

11. A flexible pipe comprising bands connected by flexible means and series of strips hinged on said bands, the strips of adjacent series overlapping and the overlapping ends being free, substantially as described.

12. A flexible pipe comprising bands connected by flexible means and series of strips hinged on said bands, the strips of adjacent series overlapping in staggered relation to one another, substantially as described.

13. A flexible pipe comprising bands connected by flexible means and series of flexible strips on said bands, the strips of adjacent series overlapping and the overlapping ends being free, substantially as described.

14. A flexible pipe comprising bands connected by flexible means and series of flexible strips on said bands, the strips of adjacent series overlapping in staggered relation to one another, substantially as described.

15. A flexible pipe comprising bands connected by flexible means and series of flexible strips hinged on said bands, the strips of adjacent series overlapping and the overlapping ends being free, substantially as described.

16. A flexible pipe comprising bands connected by flexible means and series of flexible strips hinged on said bands, the strips of adjacent series overlapping in staggered relation to one another, substantially as described.

17. A flexible pipe comprising inner and outer bands connected by interposed flexible means and series of strips on said bands, the strips of adjacent series overlapping and the overlapping ends being free, substantially as described.

18. A flexible pipe comprising inner and outer bands connected by interposed flexible means and series of strips on said bands, the strips of adjacent series overlapping in staggered relation to one another, substantially as described.

19. A flexible pipe comprising inner and outer bands connected by interposed flexible means and series of strips hinged on said bands, the strips of adjacent series overlapping and the overlapping ends being free, substantially as described.

20. A flexible pipe comprising inner and outer bands connected by interposed flexible means and series of strips hinged on said bands, the strips of adjacent series overlapping in staggered relation to one another, substantially as described.

21. A flexible pipe comprising inner and outer bands connected by interposed flexible means and series of flexible strips on said bands, the strips of adjacent series overlapping and the overlapping ends being free, substantially as described.

22. A flexible pipe comprising inner and outer bands connected by interposed flexible means and series of flexible strips on said bands, the strips of adjacent series overlapping in staggered relation to one another, substantially as described.

23. A flexible pipe comprising inner and outer bands connected by interposed flexible means and series of flexible strips hinged on said bands, the strips of adjacent series overlapping and the overlapping ends being free, substantially as described.

24. A flexible pipe comprising inner and outer bands connected by interposed flexible means and series of flexible strips hinged on said bands, the strips of adjacent series overlapping in staggered relation to one another, substantially as described.

25. A flexible pipe having a lining comprising series of hinged strips, the strips of adjacent series overlapping and the overlapping ends being free and means governing the degree of movement of said strips, substantially as described.

26. A flexible pipe having a lining comprising series of hinged strips, the strips of adjacent series overlapping in staggered relation to one another and means governing the degree of movement of said strips, substantially as described.

27. A flexible pipe having a lining comprising series of flexible hinged strips, the strips of adjacent series overlapping and the overlapping ends being free and means governing the degree of movement of said strips, substantially as described.

28. A flexible pipe having a lining comprising series of flexible hinged strips, the strips of adjacent series overlapping in staggered relation to one another and means governing the degree of movement of said strips, substantially as described.

29. A flexible pipe comprising bands connected by flexible means, series of strips hinged on said bands, the strips of adjacent series overlapping and the overlapping ends being free and means governing the degree of movement of said strips, substantially as described.

30. A flexible pipe comprising bands connected by flexible means, series of strips hinged on said bands, the strips of adjacent series overlapping in staggered relation to one another and means governing the degree of movement of said strips, substantially as described.

31. A flexible pipe comprising bands connected by flexible means, series of flexible strips hinged on said bands, the strips of adjacent series overlapping and the overlapping ends being free and means governing the degree of movement of said strips, substantially as described.

32. A flexible pipe comprising bands connected by flexible means, series of flexible strips hinged on said bands, the strips of adjacent series overlapping in staggered relation to one another and means governing the degree of movement of said strips, substantially as described.

In testimony whereof I have signed my name in the presence of two subscribing witnesses.

WILLIAM THOMAS DONNELLY

Witnesses:
 WALTER C. KANE,
 M. E. JONES, Jr.